United States Patent [19]

Nichols

[11] Patent Number: 4,742,147

[45] Date of Patent: May 3, 1988

[54] LIQUID, SOLVENTLESS, COMPLEX POLYMERIC COMPOSITIONS, THERMOSETTING AT AMBIENT TEMPERATURES THROUGH ADDITION POLYMERIZATION MECHANISMS

[76] Inventor: Gus Nichols, 2501 Gulf Freeway, Unit 5, Dickinson, Tex. 77539

[21] Appl. No.: 786,738

[22] Filed: Oct. 11, 1985

Related U.S. Application Data

[63] Continuation-in-part of Ser. No. 593,591, Mar. 26, 1984, Pat. No. 4,547,562.

[51] Int. Cl.$^4$ .............................................. C08G 83/00
[52] U.S. Cl. ..................................... 528/75; 521/149; 521/155; 521/159; 521/182; 521/183; 521/189; 524/555; 524/560; 524/590; 525/437; 526/301; 526/302; 528/44; 528/76; 528/83; 528/112; 528/119; 528/332; 528/335; 528/363

[58] Field of Search ...................... 528/44, 75, 76, 83, 528/112, 119, 332, 335, 363; 525/437; 526/301, 302; 521/149, 155, 159, 182, 183, 189; 524/555, 560, 590

[56] References Cited

U.S. PATENT DOCUMENTS

4,547,562 10/1985 Nichols ............................... 528/363

Primary Examiner—Harold D. Anderson

[57] ABSTRACT

Liquid, solventless, complex polymeric compositions are provided which thermoset at ambient temperatures through addition polymerization. In a preferred embodiment, a two component system includes a first component comprising amine or acrylate terminated polyurethanes, polyurethane-ureas or polyureas and a second component comprising di or polyacrylates. By adding an excess of acrylate, a one component system can be formed which thermosets when exposed to ultraviolet radiation.

6 Claims, No Drawings

LIQUID, SOLVENTLESS, COMPLEX POLYMERIC COMPOSITIONS, THERMOSETTING AT AMBIENT TEMPERATURES THROUGH ADDITION POLYMERIZATION MECHANISMS

BACKGROUND OF THE INVENTION

I. Related Applications

This application is a continuation-in-part of my copending application Ser. No. 593,591 filed Mar. 26, 1985, now U.S. Pat. No. 4,547,562.

II. Field of the Invention

The present invention relates to liquid, solventless, complex polymeric compositions thermosetting at ambient temperatures through addition polymerizations. More specifically, it relates to di or polyacrylates, mono and polyamine structures, as well as to their combinations and mixtures with polyurethanes, polyureas, polyurethane-ureas, di or polyepoxides, resorcinol and unsaturated polyesters either in the form of one or two component systems.

III. Prior Art

Polyurethanes are well-known polymeric compositions in the art and essentially are represented by the following three categories:

1. Polyurethane oils containing moieties of conjugated dienic double bonds, such as those found in 9,11-dehydrated castor oil acid and their isomeric bonds found in linseed oil acids. Polyurethane oils require paint driers such as cobalt and zinc naphthoates in order to dry, and are supplied as one component solutions in organic solvents.

2. Moisture curable polyurethane prepolymers are also supplied as one component solutions in organic solvents, and structurally are isocyanate terminated polyurethanes of ester or ether type containing at least 5% by weight of unreacted isocyanate groups. Thermosetting is achieved upon contact with the air humidity (water) during and after their application. In this case, the water reacts with available isocyanate groups, converting them to primary amine groups through carbon dioxide evolution. In turn, the so formed primary amine groups react even faster than water with more available isocyanate groups to form urea and biuret linkages at the terminal sites of the original prepolymer, forcing it to thermoset.

3. Two component polyurethanes, named for convenience as component A and component B, are individual solutions in organic solvents. Component A is an isocyanate terminated polyurethane prepolymer based on toluene diisocyanate and a polyoxyalkylene diol or a diol terminated polyester having a hydrogen to isocyanate group ratio equal to $NCO/OH=(n+1)/n$, wherein n is an integer. Component B is composed from a diol, polyol, chlorinated aromatic diamine or hydroxyl terminated polyurethane and their mixtures having a hydroxyl to isocyanate group ratio of $OH/NCO=(n+1)/n$.

All three of the above categories of polyurethanes find broad applications in varnishes, coatings, paints, plastics, foams, shoes, elastic fibers, etc. However, such broad applications have their own inherent drawbacks and deficiencies as result of the following factors:

A. The presence of organic solvents in all three polyurethane categories which can cause environmental pollution and waste through evaporation;

B. Solvent entrapment in the film which can cause voids and blisters, thus yielding a less compact film and practically nullifying the possibility of casting or molding large parts, or even forming thicker films;

C. Polyurethane oils are often dominated in structure by the dienic unsaturated fatty acids, and behave more or less like typical air dried alkyd resins of tung-oil;

D. Moisture curable polyurethanes, as well as two component polyurethanes of categories (2) and (3) contain unreacted isocyanate groups which, because of their high reactivity toward atmospheric humidity, amines, ammonia, alcohols and other hydroxyl containing compounds, present a series of storage problems. For example, categories (2) and (3) have to be kept in dry, tightly closed containers, and preferably under dry nitrogen pressure. Furthermore, the organic solvents used in solutions containing isocyanates should be dry and free from water, amines, ammonia, alcohols, diols, organic acids or other hydroxyl or amine containing compounds. The same is also true for pigments, pigment extenders, fillers and dyes used with polyurethanes.

E. The performance properties of moisture curable polyurethanes can vary according to humidity conditions in the atmosphere, and the wetness of the substrate, application equipment, and accessories. Generally, the performance properties are not easily reproducible; moreover, it is true in the better controllable category (3) of the two component polyurethane systems, if water or other reactive ingredients from the air or other sources enter into the applied system, the stoichiometry changes at least twofold, because the water reacts with isocyanate groups, converting them to primary amine groups, which in turn react with more unreacted isocyanate groups, therefore causing an excess of component B containing an excess of hydroxyl or amines, producing less desirable performance properties.

Isocyanate terminated polyurethane-ureas and polyureas have essentially the same problems and deficiencies as the solution polymers discussed above and they require more organic solvents as do higher melting prepolymeric isocyanate terminated polyurethanes.

Unsaturated polyesters as a rule are hydroxyl terminated condensation prepolymers having a molecular weight of about 2500-3500. A common composition is based on 1.0 mole maleic anhydride or fumaric acid, 1.0 mole phthalic anhydride or isophthalic acid and 2.3 to 2.6 moles of 1, 2 propylene diol, which is diluted with styrene monomer to form a 45 to 70 percent by weight solution. Addition of catalysts such as ketone hydroperoxide or benzoyl peroxide, and accelerators such as cobalt naphthoate, cause thermosetting through addition reaction crosslinking between the styrene monomer and the maleic anhydride double bonds; however, the resulting films and parts are very brittle due to the rigid structure of styrene and maleic anhydride and also due to extensive crosslinking.

Diepoxides are either liquids having viscosities of about 6000 cps or solids, and require organic solvents in order to be used as binders in coatings and paints. The liquid diepoxides preferably used in the coatings and/or paint industries are diglycidyl ethers, either of 4,4'-isopropylidenediphenol (also known as bisphenol A), or of O,O'-methylene diphenol or dicresol (known as novolacs). Diepoxides are provided as solutions in organic solvents, and in the form of two component systems. Epoxides thermoset at ambient temperatures upon mixing in stoichiometric ratios with an aliphatic polyamine such as diethylene triamine or triethylene tetraamine (TETA) or amine terminated aliphatic polyamides based on dimer fatty acids. Again, the deficiencies resulting from the presence of organic solvents remain, as well as rigidity of the structure, due to high functionality of TETA which is hexafunctional and to the aromatic structure of many diepoxides. In addition, aromatic epoxides have poor weatherability and rapidly fade under the influence of the ultraviolet light from the sun.

In view of the foregoing, it is obvious that it would be an important advancement in the art to provide solventless, liquid, complex polymeric compositions having a viscosity of less than about 4000 cps at ambient temperatures, which thermoset through addition polymerizations to provide void free and compact coatings, paints and parts of virtually any desired shape or thickness and which can be applied by spraying, brushing or pouring.

It would be still a further advancement to provide polyurethanes, polyurethane-ureas and polyurea prepolymers that are not sensitive to water, amines or other hydroxyl compounds, which are not isocyanate terminated, but which are amine and acrylate terminated, and capable of further reactions with diepoxides, unsaturated polyesters and other compounds.

It would further be desirable for the advancement of the art to modify unsaturated polyesters and epoxides to reduce their viscosity such that they can be used in solventless systems, and to modify their brittleness to acceptable flexibility and toughness levels. Furthermore, it would be highly desirable to provide solventless, liquid polyurethanes, polyureas and polyurethane-urea castings having exceptional flexibility, impact resistance and toughness without utilizing 4,4'-methylenebis(2-chloroaniline) (MOCA), which is a suspected carcinogen.

Above all, it would be extremely advantageous in the advancement of the art to combine totally or partially in a one or two component system, polyamines, polyacrylates, diepoxides, polyurethanes, polyurethane-ureas, polyureas and unsaturated polyesters, as a solventless, liquid polymeric system of less than 4000 cps viscosity, thermosetting at ambient temperatures to form complex polymeric compositions which are chemically interconnected, and not alloyed together with any ingredients, stable on storage and not sensitive to the water, amines, ammonia, or alcohols. All of the above-mentioned advantages and many others are accomplished by the present invention.

SUMMARY OF THE INVENTION

The present invention provides liquid, solventless, complex polymeric compositions either in the form of one or two component systems, thermosetting at ambient temperatures to yield void free, compact films and parts of any desired size, shape and thickness, having exceptional physical and chemical performance properties. The intermediate ingredients of the compositions are storage stable, not isocyanate terminated or alloyed, and react chemically with each other to form the final complex compositions.

The ingredients of the two component system are named for convenience component A and component B. Component A comprises amine or acrylate terminated polyurethanes, polyurethane-ureas, polyureas, adducts of diepoxides with methyl acrylic and acrylic acid, di or polyfunctional amines, as well as di or polyfunctional amine-terminated polyamides, di or polyfunctional acrylates and styrene monomer diluted unsaturated polyesters. Component B comprises di or polyacrylates, di or polyepoxides, acrylate terminated polyurethanes, polyurethane-ureas, polyureas, epoxide adducts of secondary amine terminated polyurethanes, polyurethane-ureas or polyureas, cresols, resorcinols, and styrene monomer diluted unsaturated polyesters.

Peroxide catalysts can be included in either component A or B and preferably are kept away from styrene monomer-diluted unsaturated polyesters in order to enhance storage stability. The two component system by no means has to be so complex, and many of the ingredients of either component are optional choices. Also, the two component system is not limited to liquids, or solventless liquid of relatively low viscosity, but can be extended as well to solution systems, allowing the use of solid epoxides, solid diamines and others in exchange for the deficiencies of the organic solvents.

The one component system comprises di or polyacrylates reacted with primary monoamines, mono isocyanate acrylamides, diisocyanates, isocyanate terminated polyurethanes, polyurethane-ureas, polyureas, acrylic epoxides alone or in admixtures, and contain photocatalysts and photoinitiators. The basic provision is to contain one, and preferably more, unreacted acrylic linkage, so that it can be thermoset upon exposure to ultraviolet light or an electron beam within a few seconds. The same compositions applied outdoors behave like "living" polymers, and continue to polymerize over long periods of time under the ultraviolet light of the sun, which is less intense.

DETAILED DESCRIPTION OF THE PREFERRED EMBODIMENTS OF THE INVENTION

The present invention is directed to the preparation of liquid, solventless, complex compositions of relatively low viscosity (less than about 4000 cps) which are designed so that all involved ingredients will be chemically reacted after the application, and not simply alloyed. Furthermore, these materials contain no unreacted isocyanate groups, are stable on storage and upon exposure to water, amines, ammonia or alcohols, and can be applied as clear, filled and pigmented films by brushing, rolling, dipping, or spraying, or can be poured into molds and laminates to form void free castings and laminates with minimal external pressure at ambient temperatures. Fillers include metal powders up to about 98% by weight, sand up to about 96% by weight, glass cloth, KEVLAR (a polyaromatic amide fiber of para orientation from DuPont), nylon, glass fibers and thermoplastic powders up to about 80% by weight.

An amine terminated polyurethane of the ether type is prepared by reacting n+1 moles of diisocyanate with n moles of a polyoxyalkylene diol to form an isocyanate terminated polyurethane prepolymer. One mole of this prepolymer is then slowly added under cooling and mixing to 2.0 moles of a secondary amine-ester to form the amine terminated polyether-urethane.

Amine terminated polyester-urethanes are prepared in the same manner as polyether-urethanes by the equivalent replacement of the polyoxyalkylene diol with a hydroxyl terminated polyester. Secondary amine-esters are prepared from the addition reaction of either 2.0 moles of a primary amine to 1.0 mole of a diacrylate or the addition of 2.0 moles of a mono acrylate to 1.0 mole of a primary diamine at ambient temperatures. The foregoing procedures are also applicable to the preparations of amine terminated polyurethane-ureas and polyurea prepolymers.

Acrylate terminated polyurethanes, polyurethane-ureas and polyurea prepolymers are similarly prepared as follows: n+1 moles of a diisocyanate are mixed either with n moles of polyoxyalkylene diol or n moles of a hydrdoxyl terminated polyester to form an isocyanate terminated polyurethane prepolymer. One mole of the prepolymer is then added to 2.0 moles of a hydroxyl alkylene monoacrylate to form an acrylate terminated polyurethane prepolymer. Alternatively, the isocyanate terminated prepolymers can be converted to their acrylate terminated derivatives by reacting them with 1.0 mole of a secondary amine acrylate or secondary amine polyacrylate per mole of isocyanate group. Secondary amine mono and polyacrylates are prepared at ambient temperature from the incomplete addition reaction of 1.0 mole of a primary amine to 1.0 mole of a diacrylate or 1.0 mole of a triacrylate or 1.0 mole of a tetraacrylate.

Partial, but equivalent replacement of the polyoxyalkylene diol or hydroxyl terminated polyester with a secondary diamine or secondary diamine-ester of the isocyanate polyurethane prepolymers converts them to isocyanate terminated polyurethane-urea prepolymers, while the total but equivalent replacement yields isocyanate terminated polyurea prepolymers. All these isocyanate prepolymers are then converted to either amine or acrylate prepolymers as previously described which are stable toward water, amines, ammonia, alcohols and in storage.

Other categories of mono, di and polyacrylate structures involve the addition of methyl acrylic and acrylic acid to di, tri or tetra epoxides. Such additions are carried out at ratios of 1/1 or less of carboxylic acid group per oxirane group and respectively result in hydroxyl, di, tri and tetra acrylate structures. Ratios of less than 1/1 respectively result in mono and poly hydroxyl acrylate-epoxide structures. Adducts of mono or polyfunctional amines with diepoxides are formed by the addition of at least 2.0 moles of a diamine to 1.0 mole or less of a diepoxide.

Illustrative examples of all involved ingredients and methods of preparing components A and B are given by way of illustration and without limitation to the scope of this invention.

Polyoxyalkylene diols are exemplified by polyoxyethylene glycols, polyoxyisopropylene glycols and polyoxybutylene glycols having molecular weights from 106 to about 2000, and are represented by the general structure $HO(CH_2-CXO)XCH_2CXOH$, wherein X is equal to a hydrogen, methyl group or both and defines the molecular structure of the particular diol.

Hydroxyl terminated polyesters are based on the condensation reaction between n moles of a dicarboxylic acid such as adipic or azelaic acid and n+1 moles of a diol such as 1,4 butylene diol or 1,6 hexylene diol through the elimination of 2n moles of water and are represented by the general formula as follows:

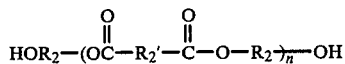

wherein $R_2$ and $R_2'$ are divalent radicals (equal or different), and n is an integer sufficient such that the molecular weight is between 400 and about 2000. Illustrative examples of suitable diisocyanates are toluene diisocyanate, p,p' methylene diphenylene diisocyanate, hexamethylene diisocyanate, isophorone diisocyanate and the like. A large number of isocyanate terminated prepolymers can be made based on the above diisocyanates, polyoxyalkylene diols and hydroxyl terminated polyesters.

In addition, commercially available products such as ADIPRENE L-100, and L-150 (DuPont's products) and DESMODURE (Mobay's products), and others can be used as isocyanate terminated prepolymers.

Illustrative examples of primary amines are those having an aliphatic, cycloaliphatic, heterocyclic or aromatic structure and are exemplified by monoethanolamine, butylamine, 2-ethylhexylamine, octylamine, dodecylamine, tetradecylamine, octadecylamine, cyclohexylamine, tetrahydrofurfurylamine, tolueneamine, their isomers, their substituted derivatives and higher homologues.

Illustrative examples of monoacrylate esters are methyl and ethyl acrylates and their alpha methyl homologues. Illustrative examples of hydroxyl alkylene acrylates are hydroxyl ethyl and hydroxyl propyl acrylates, as well as their alpha methyl homologues.

Illustrative examples of primary diamines include those having aliphatic, cycloaliphatic and aromatic structure exemplified by: 1,6 hexamethylene diamine; 2-methyl 1,5 pentylene diamine; 2-ethyl 1,4 butylene diamine; ethylene diamine; 1,3 propylene diamine; 1,2 cyclohexylene diamine; 2 p,p' methylene biscyclohexylene diamine; metaxylylene diamine; 1,3 phenylene diamine; p,p', methylene dianiline; O,O' dichloro, p,p' methylene dianiline; p,p' sulfone dianiline; p,p' oxydianiline; their isomers, substituted derivatives and higher homologues.

Illustrative examples of polyamines are: diethylene triamine; bis(p-amnobenzyl)aniline, known as BABA (a product of DuPont Company); triethylene tetramine; and the addition and condensation products of any of the above di or polyamines with acrylic or methyl acrylic acid utilized in a molar ratio of n+1 moles of amine per mole of acrylic or methyl acrylic acid. Wherein, n is an integer. Also, the adducts of n+1 moles of a di or polyamine with n moles of a diacrylate and their like can be used. Illustrative examples of di and polyacrylates are: neopentyl glycol diacrylate; 1,6 hexylene diol diacrylate; oxydiethylene glycol diacrylate; polyoxyalkylene diol diacrylates represented by the general formula as follows:

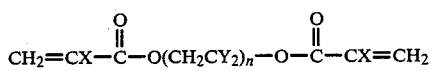

wherein X is equal to a hydrogen or methyl group, Y is equal to hydrogen or a methyl group or both, and n is an integer such that the molecular weight of the polyoxyalkylene diol is selected to be between 176 and about 2000. Commerical examples are the series C-2000; C-2100; C-3000; C-9000; C-9001 acrylates (Sartomer Co.) and those of Alocolac Company. The triacylate of trimethylol ethane or propane, the triacrylate of pentaerythritol and the tetra acrylate of pentaerythritol can also be used. Other di or polyacrylates are the adducts of acrylic and methyl acrylic acids to di or polyepoxides at a ratio of 1/1, or less, of carboxylic group per oxirane group to form hydroxyl di or polyacrylates, as follows:

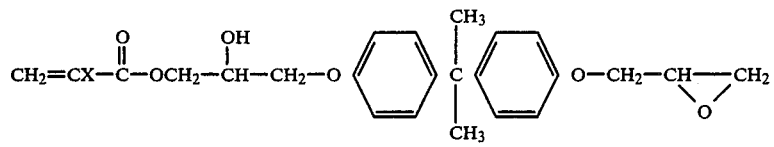

Illustrative examples of di and polyepoxides are: the diglycidyl ether of p,p' isopropylidinediphenol, the diglycidyl ether or orthomethylene diphenol or dicresol known also as Novolaks, Shell's Epon 1031 which is a tetraglycidyl ether of tetraphenyl ethane, the Bakeleite ERL-4221 of Union Carbide Co., other Novolaks having the general structure

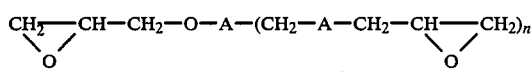

wherein n=1, to 3, or higher and A is a divalent radical equal to phenylene or methyl phenylene or the like.

Illustrative examples of styrene monomer diluted polyesters are the several commercially available products which are in the following categories (a) condensation hydroxyl polyesters based on 1.0 mole of maleic anhydride or fumaric acid, 1.0 mole of phthalic anhydride or isophthalic acid and 2.3 to 2.6 moles of 1,2 propylene glycol or 1,4 oxydiethylene glycol, and (b) based on 2.0 moles of maleic anhydride, 1.0 mole of p,p' dimethyl methylene bisphenol and 2.3 to 2.6 moles of 1,2 propylene glycol or 1,4 oxyethylene glycol.

The one comonent liquid, solventless systems can be prepared as follows: from the limited addition reaction of 1.0 mole of a mono primary amine to 1.0 mole of a diacrylate, triacrylate or tetracrylate to respectively form a secondary amine(imine)-ester monoacrylate, diacrylate or triacrylate followed by the addition of an epoxide (oxirane) group equivalent of a di or polyepoxide, plus photoinitiators and photocatalysts, to form photoprepolymers, thermosetting by addition polymerization upon exposure to ultraviolet light or electron beam radiation. Alternatively, the above ester-imino mono and polyacrylates can be further mixed either with isocyanate terminated prepolymers or simply a diisocyanate and a polyoxyalkylene diol at an equivalent ratio of NCO/OH equal to (n+1)/n, while the equivalent ratio of NH/NCO is equal to 2/1. Furthermore, isocyanate terminated polyurethanes, polyurethane-ureas and polyureas can be replaced with their isocyanate and acrylamide analogues. The so formed urea ester, urea ester acrylamido mono or polyacrylate prepolymers can be diluted with adducts of acrylic or methyl acrylic acid and di or polyepoxides.

The one or two component liquid solventless systems can also be diluted from 10 to 90% with unsaturated polyester solutions in styrene.

APPLICATIONS

The enormous number of ingredient and structure combinations of one or two component, liquid, solventless compositions covers the broadest known choice in producing final products having exceptional toughness, elasticity and outstanding chemical resistance. The fact that the compositions are liquids of relatively low viscosity and set through an addition polymerization mean that compact, void free, clear and pigmented sprayable and pourable films and parts of any desired thickness, shape and size may be fabricated.

Furthermore, the ability to incorporate metal powders (i.e. iron, nickel, zinc, aluminum, copper, cobalt, chrome, titanium, tin beryllium, vanadium, tantalum, magnesium, manganese, lead, calcium, boron, silicon, carbon, and their mixtures) in a pliable form from 85 to 98% solids by weight or in a liquid form of less than 85% solids by weight, provide an excellent method of casting metals and their alloys in very homogenous compositions.

The same is also true for glass, glass products, ceramics, and refractories based on metallic oxides, of alkali, alkaline earth, aluminates, silicates, borates, etc. It was found that the two component solventless system can be filled with up to 96 wt% sand or concrete diluted with water to yield sandstones and fortified concrete at ambient temperatures. More specifically, mixing 75 to 80% by weight sand, 0.5 to 1% by weight pigment such as green chrome oxide, red, black or yellow iron oxide and 24 to 30% of the two component solventless system yields a pourable mixture, which when cast in 3×6 inch PVC cylinders at ambient temperature yield compositions having compression strengths in excess of 16,500 lbs/square inch. Comparatively, cast concrete cylinders of the same dimensions require 30 days of ambient temperature curing and achieve maximum compression strengths of only about 3200 lbs/square inch. The standstones of this intention, after a few hours curing at ambient temperatures, neither shrink nor expand significantly and therefore do not crack, and are resistant to salts, environmental pollution, weathering, chemical attack and are fire resistant as well.

Steel reinforcement of these sandstones further increases their compression strength, while preventing rusting of the steel. These distinctively superior properties of the sandstones of this invention over concrete strongly suggests their use in the construction of roads, bridges, airports, sea piers, docks, commercial or residential buildings, swimming pools, floors, parking lots, storage tanks, pipes and pipelines for sewer, water, crude oil, and natural gas which can be used on land or sea.

Additional advantages of the present invention include coatings and parts which have permanent color shades, are maintenance free, are easy to be fabricated, and can be used shortly after they are fabricated. Grinding of pigments in one component from about 2 to about 60% by weight of the final mixture is done readily and more safely due to the absence of organic solvents and results in sprayable, solventless paints which are compact, glossy, tough and chemically resistant. There is no atmospheric pollution, because nothing evaporates or condenses, and very thick films are obtained even on vertical surfaces in a one pass application which distinguishes the present invention from solution paints.

The one or two component liquid solventless systems are also ideal binders for composites containing from 10 to 90%, and more preferably 30 to 75% by weight of cloth fibers of glass, graphite, nylon, KEVLAR (aromatic polyamides of para orientation), whiskers of alumina, berylia, zirconia and boron oxide. These composites are excellent candidates in the form of laminates and parts in the manufacturing of pleasure boats, ships, automotive and aircraft parts of engines, bumpers, fenders, doors, tails and interiors, as well as industrial filters and membranes.

In addition, trains, wagons, tractors, trailers, and mobile homes can be manufactured exclusively, or to a major extent from these composites and sandstones. Other applications involve the construction of protective walls of war ships, tanks, buildings, bullet proof helmets and clothing. Furthermore, said filled liquid solventless systems can be used in sealing oil and gas wells and radioactive waste.

The one component liquid, solventless systems provide photopolymers with improved adhesion and toughness for printed electrical circuits, waxless floor coatings, and printing inks for newsreel and photocopies.

Other important applications of the one and two component liquid, solventless systems are foamed sandstones with volatile hydrocarbons, fluorohydrocarbons, azonitrites and other well known foaming agents. Most preferably, the specific density of these sandstones is reduced from ½ to 1/20 of the original specific gravity and as such have excellent thermal and acoustical insulation properties and, being about seventy-five percent (75%) by weight sand, are non-combustible.

Many other applications will become obvious to one skilled in the art from the following specific examples:

EXAMPLE 1

In a two liter resin kettle equipped with a mechanical stirrer, vertical condenser and provision for either external cooling with a water bath or heating with a heating mantle were placed: 600 grams (1.5 moles) of polyoxyethylene glycol having an average molecular weight of about 400, and 348 grams (2.0 moles) of a 2,4 and 2,6 toluene diisocyanate mixture which was 80% by weight of the 2,4 isomer. The compounds were mixed under cooling for about three hours at 25° to 40° C., and then heated for one additional hour at 90° C. to form an isocyanate terminated polyether-urethane.

Separately, in another properly equipped two liter resin kettle were placed 464 grams (4.0 moles) of 2-methyl 1,5 pentylene diamine and through a dropping funnel slowly, and under cooling with a water bath, were added 688 grams (8.0 moles) of methyl acrylate. Stirring was continued at about 40° C. until the primary amines were converted to secondary amine esters through the addition reaction of 2.0 moles of methyl acrylate to 1.0 mole of 2-methyl 1,5 pentylene diamine and the formation of di(ester-secondary amine).

To 288 grams (1.0 mole) of the above di(ester-secondary amine) under mixing and cooling were added 948 grams of the isocyanate terminated polyether-urethane containing one unreacted isocyanate group to form a secondary amine-urea terminated polyether-urethane, which is stable toward water and other active hydrogen containing compounds. These secondary amine-urea terminated polyether-urethanes are capable of reacting further with liquid diepoxides at ambient temperature or higher to form solventless liquid linear elastomers.

Thermosetting solventless polymers of the addition type are provided by mixing 1.0 mole of the secondary amine-urea terminated polyester-urethane with 0.5 to 10 or more moles of a diamine or polyamine to form the component A, while component B is formed either from liquid diepoxides diluted by di or polyacrylates diluted or not with unsaturated polyesters.

In calculating the stoichiometry of components A and B, the following rules are applicable. A primary amine group adds to an acrylic double bond of di or polyacrylates, converting it to a secondary amine acrylate. These secondary amine groups, as well as those of secondary amine-urea polyester-urethane represent the sum of oxirane (or epoxide) groups to be used. An excess of acrylic double bonds over primary and secondary amine hydrogen atoms available provide "living" type thermosetting polymers through further addition polymerization under the influence of ultraviolet light over extended periods of time (months or years). Furthermore, an excess of acrylic double bonds provide linking sites for styrene and maleic anhydride double bonds, when unsaturated polyesters are used, either in the component A or B of such solventless systems. It is important to mention that the secondary amine-urea terminated polyether-urethanes are soluble in liquid di or polyfunctional amines, and during their addition reactions with both di or polyfunctional acrylates and epoxides, as well as unsaturated polyesters are chemically converted, and not alloyed by them.

The possibilities of combinations for solventless systems providing flexibility through structure selection, linearity with abrasion, hardness, strength and toughness is greater than before because of the ability to chemically interreact with so many different categories of chemical compounds and prepolymers. The styrene diluted unsaturated polyesters not only act as effective viscosity reducers, but also provide rigidity to the systems and in exchange, flexible and tough unsaturated polyesters are obtainable.

EXAMPLE 2

In the two liter resin kettle equipped as in Example 1 were placed: 730 grams (5.0 moles) of adipic acid and 450 grams (6.0 moles) of 1,4 butene diol. The mixture was heated to 220° C. for 3 to 4 hours until 180 grams of water were removed to form a hydroxyl terminated polyester of adipic butene diol having an average molecular weight of about 1000. To this compound were added 217.5 grams (1.25 moles) of toluene diisocyanate and 58 grams (0.5 moles) of hydroxyl ethylene acrylate. The mixture was first cooled with a water bath then heated to 80° C. to form an acrylate terminated polyester-urethane. This polyurethane was used as a 20 to 50% blend with general purpose unsaturated polyester peroxide catalysts to form tough elastomeric castings. Such blends of acrylate terminated polyurethanes can be used either as constituents of component A or of component B in conjunction with the di or polyfunctional amines, diepoxides and di or polyacrylates and their combinations.

EXAMPLE 3

In a two liter resin kettle equipped as in Example 1 were placed 226 grams (1.0 moles) of 1,6 hexylene diol diacrylate and, with cooling and mixing, 460 grams (2.0 moles) of PA-14 (TOMAH PRODUCTS), which is an oxytetradeca primary amine, were added to form a secondary di(amine-ester) through the addition of the primary amine hydrogen atom to the acrylate double bond. Spectrographic detection of the disappearance of the acrylate double bond was observed.

When this addition was completed, 200 grams (0.8 moles) of 4,4' methylene diisocyanate (MDI) were added and mixed under cooling to form a secondary amine terminated polyurea. When 0.4 moles of MDI were replaced with 809 grams (0.4 moles) of ADI-PRENE L-100 (DuPont) an isocyanate terminated polyether-urethane the resulting product was a secondary amine terminated polyurethane-urea.

Similarly, the addition reaction of monoethanolamine to a diacrylate C-9000 (SARTOMER CO.) in a 1/1 molar ratio (61 grams to 870 grams) followed by the addition of 120.7 grams (0.75 moles) of TDI finally results in a secondary amine terminated polyurethane-urea.

A secondary amine and acrylate terminated polyurea was formed as follows: Into a two liter resin kettle were placed 366 grams (2.0 moles) of dodecyl (or lauryl) primary amine and 296 grams (1.0 moles) of trimethylol propane triacrylate and mixed under cooling conditions to form a secondary amine-ester acrylate. Mixing of this mixture with $(n+1)/n$ moles of a diisocyanate or diisocyanate terminated polyurethane, polyurea or polyurethane urea provides secondary maine and acrylate terminated polyurethanes, polyureas and polyurethane-ureas.

In another experiment the trimethylol propane triacrylate was replaced by pentaerythritol tetra acrylate and provided secondary amine and acrylate terminated polyurethanes, polyureas and polyurethane-urea with twice as much acrylate.

EXAMPLE 4

A reactor system was assembled consisting of a two liter resin kettle equipped with a mechanical stirrer, nitrogen inlet, with a Dean Stark water trap attached to a water condenser, with provisions for cooling the reactor with a water bath and heating the reactor with a heating mantle.

Into the reactor were placed 696 grams (6.0 moles) of 2-methyl 1,5 pentylene diamine. Under continuous mixing and cooling, 258 grams (3.0 moles) of methyl acrylic acid were also added. After about 90 minutes the exotherm of neutralization ceased and the kettle was then heated to 160°–190° C. for four hours until 54 grams (3.0 moles) of water were removed overhead to form the diamide tetramine containing six amine hydrogen atoms having a molecular weight of 300.

The same experiments were repeated by utilizing a molar ratio of 3/2, 4/3, 5/4, and 6/5 of 2-methyl 1,5 pentalene diamine to methyl acrylic acid or acrylic acid.

In other experiments, 2-methyl, 1,5 pentylene diamine was replaced with 1,6 hexamethylene diamine, xylylene diamine, isophorone diamine, polyoxypropylene diamine-400 (JEFFAMINE D-400, a TEXACO CHEMICAL, INC. product), m-phenylene diamine, 4,4 oxydianiline, and 4,4' methylene diamine.

EXAMPLE 5

In the resin kettle described in Example 1 were placed 792 grams (4.0 moles) of 4,4' methylene dianiline (MDA) (also known as 4,4' methylene diphenyl-amine) and 812.8 grams (3.2 moles) of 1,6 hexylenediol dimethyl acrylate. Under continuous mixing this mixture was heated for at least two hours at about 190° C. to yield the adduct of 5 moles MDA and 4 moles of 1,6 hexylenediol dimethyl acrylate. The molecular ratio of 4/3.2 is equivalent in integral numbers to 5/4 and this adduct is a stable, liquid prepolymer at ambient temperatures. This structure is chemically an aromatic primary amine terminated polyimine-alpha methyl propionate of 1,6 hexylenediol-ester, having an average molecular weight of 2006 ($5 \times 198 + 4 \times 254 = 2006$), a total of 12 amine hydrogen atoms of which 4 are primary and 8 secondary amine hydrogen atoms. This liquid adduct, upon mixing at 0.929/1, 0.912/1 and 1.03/1 respective weight ratios with EPON-828, DOW-431 novolac and DOW TACTIX-742 trifunctional liquid novolac epoxy resins, yields liquid solventless mixtures thermosetting at ambient temperatures through addition polymerization mechanisms. The obtainable films and parts were found to have outstanding physical and chemical resistance. The thermosetting at ambient temperatures of the aromatic diamine-polyamine-ester adduct with liquid epoxide is explained by the liquid consistency and functionality of 12 of the system.

The outstanding physical and chemical resistance performance properties are attributed to the relatively high molecular weight hardener (2006), the sizeable aromatic structure of hardener and epoxies, as well as the high functionality (12) of a flexibly structured molecule.

Liquid, solventless two component systems with viscosities less than 1500 cps are formed as follows:

Component A is formed from 40.12 grams (0.02 moles) of the adduct described above and 0.8 grams of CYMEL-303 (hexakis-methoxy-methylene melamine from AMERICAN CYANAMID CO.);

Component B is 36 grams (0.04 epoxy equivalents) of EPON-828 and 5.08 grams (0.02 moles) of 1,6 hexylenediol dimethyl acrylate. To form the desired polymer, 0.948 parts by weight of A are mixed with 1 part of B.

Other combinations are as follows:

Component A is formed from 40.12 grams of the adduct and 1.28 grams of CYMEL-303, and component B is formed from 72 grams of EPON-828 heated for one hour at 160° C. with 11 grams of resorcinol, then cooled and added to 5.08 grams of 1,6 hexylenediol diacrylate. The polymer is formed by mixing 0.472 parts by weight of A with 1 part of B.

Component A can also be formed by mixing 40.12 grams of the adduct, 1.1 grams of CYMEL-303, and 10.9 grams (0.04 moles) of 4,4' sulfono dianiline (HT-976 hardener from CIBA-GEIGY CO.). Component B can be formed by mixing 50.4 grams of EPON-828 with 15.24 grams of 1,6 hexylenediol dimethylacrylate. The polymer is formed by mixing 0.78 parts by weight of A with 1 part of B.

The molar ratio of $(n+1)/n$ of an aromatic (or nonaromatic) diamine over any diacrylate or N,N' methylene bis-acrylamide and their methyl derivatives are used to make their adducts, wherein n is most preferably equal to an integer from 1–5. Heating is required for at least two hours at 190° C. only for aromatic diamines. The stoichiometry of n moles of primary diamine addition to a liquid diepoxide is ¼. Since an acrylate or methyl acrylate double bond is equivalent toward their addition reactions with primary and secondary amine hydrogen atoms there are many possible combinations. For example, for n=4, the aromatic amine adduct to a diacrylate is 5/4 and 1.0 mole of it requires either 12 equivalent epoxides, 10 equivalent epoxides plus 1 mole diacrylate, or 8 equivalent epoxides plus 2 moles diacrylate, or 6 moles epoxides plus 3 moles diacrylate, or 4 moles equivalent epoxides plus 4 moles diacrylate, or 2 moles equivalent epoxides plus 5 moles diacrylate or simply 6 moles of diacrylate. These possible ties are further multiplied by dissolving m moles of a different diamine in n moles of the (n+1)/n adduct, wherein m is an integral number equal or different to n.

Furthermore, these possibilities are further increased when the adduct of n+1 moles of liquid di or tri epoxide with n moles of a dihydroxyarylene are used as substitutes for epoxides, di or poly acrylates (or methyl acrylates) or di or poly acrylamides (or methyl acrylamides).

Addition of styrene unsaturated polyester to either component A or B can be added as 5 to 95% of the total final weight above the stoichiometry utilized. While the addition of acrylate or amine terminated prepolymers of urethanes, ureas and urethane-ureas follows the stoichiometrical rules that an amine hydrogen is equivalent to an epoxide equivalent or acrylate double bond and an excess of acrylate double bonds yields either "living" thermosetting polymers or photoprepolymers.

In further experiments similar to Example 5, methylene dianiline was replaced with m-phenylene diamine, the 1,6 hexylenediol dimethyl acrylate was replaced by tetraethylene glycol dimethyl acrylate and their acrylate analogues. EPON-828 was replaced with DOW-431 novolac and DOW TACTIX-742 trifunctional novolacs. Resorcinol was replaced with 1,4 dihydroxy phenylene and 2,6 dihydroxy naphthylene. Also, pigmented, filled and composite films and parts of several shapes were made.

EXAMPLE 6

In the equipment described in Example 1 were placed 432 grams (4 moles) of 1,3 phenylene diamine and 258 grams (3.0 moles) of methyl acrylic acid. Under continuous stirring this mixture was heated at 160° C. to 180° C. for about 3 hours until 54 grams (3 moles) of water were collected overhead.

The final product was a 1,3 phenylene diamine terminated tri 1,3 phenylene-imine-alpha methyl propionamide formed by the addition and condensation reaction of 4 moles of 1,3 diamine and 3 moles of methyl acrylic acid. To this final product 264 grams (0.8 moles) of tetraethylene glycol dimethyl acrylate was added and heating was continued at 190° C. for about 2-3 hours, increasing its molecular weight through an addition reaction. The final product was a viscous liquid at ambient temperatures. The repeating segment of this prepolymer contains a total of 5.4 amine hydrogen atoms per 900 grams, of which 0.2 are primary and 5 are secondary.

Component A is formed from 90 grams plus 2 grams CYMEL-303, and component B is formed from 93.6 grams of EPON-828 plus 6.6 grams of tetraethylene glycol dimethyl acrylate (TEGDMA) or 51.6 grams of EPON-828 plus 39.6 grams of TEGDMA, with the respective weight ratios of A/B being 0.9/1 or 0.947/1.

In other experiments the 1,3 phenylene diamine was replaced with 4,4' methylene dianiline, the TEGDMA was replaced with 1,6 hexylenediol diacrylate, tetraethylene glycol diacrylate and neopentyl glycol dimethyl acrylate. EPON-828 was replaced with DOW-431 novolac and DOW TACTIX-742 novolac.

EXAMPLE 7

Into the equipment described in Example 1 were placed 292 grams (2.0 moles) of diethyl oxalate and 432 grams (4.0 moles) of 1,4 phenylene diamine. The reactor was then heated to 160° C. for 3 hours untiL 184 grams (4 moles) of ethanol were removed and 2.0 moles of the di(amine-1,4 phenylene)oxalamide were formed. Prior to cooling, 330 grams (1.0 mole) of tetraethylene glycol (tetraoxyethylene diol)dimethyl acrylate were added, and heating was continued at 185° C. for an additional 2½ hours to form a primary aromatic di(amine-imine-ester-oxalamide) having a molecular weight of 740 and 6 amine hydrogen atoms, of which 4 are primary and 2 secondary. Component A is formed from 74 grams (0.1 mole) of this material and 1.7 grams of CYMEL-303. Component B is formed from 72 grams of EPON-828 and 22.6 grams of 1,6 hexylenediol diacrylate. The mixing ratio of A/B is 0.8/1.

EXAMPLE 8

Into the equipment described in Example 1 were placed 130 grams (0.5 mole) of PA-14 (oxytetradecamine) and 113 grams (0.5 mole) of 1,6 hexylenediol diacrylate and were mixed at ambient temperature for about 70 minutes until almost all primary amine was converted to imine-ester-acrylate. Then 511 grams (0.25 mole) of ADIPRENE L-100 (an isocyanate terminated polyether urethane of about 2044 molecular weight from DuPont) were slowly added under cooling and continuous stirring to form a liquid urea-polyether-urethane-ester diacrylate, which, upon addition of about 1% by weight of a photoinitiator (hydroxy acetophenone) and 0.5% by weight of a tertiary amine, provides a photoprepolymer with excellent film flexibility. The partial or total replacement of 1,6 hexylenediol diacrylate with trimethylol propane triacrylate yields similar photoprepolymers containing above 2 and 4 acrylate double bonds per mole. Similarly, the partial or total replacement of 1,6 hexylenediol diacrylate with pentaerythritol tetra acrylate provides similar photoprepolymers containing from above 2 to 6 acrylate double bonds per mole.

EXAMPLE 9

Into the equipment described in Example 1 were placed 600 grams (1.5 moles) of polyoxyethylene diol E-400, 435 grams (2.5 moles) of toluene diisocyanate and 36 grams (0.5 moles) of acrylic acid. The mixture was cooled under continuous stirring for about 1½ hours. Then 278 grams (0.5 mole) of oxytetradecamine 1/1 adduct with trimethylol propane triacrylate was added via a dropping funnel. When the exotherm subsided, the water bath was removed and heat was slowly applied for 2 hours and the temperature was elevated to 100° C., causing continuous evolution of carbon dioxide. The final product was an acrylamide-urea-ester-polyether-urethane diacrylate photoprepolymer.

EXAMPLE 10

Into the equipment described in Example 1 were placed 400 grams (1.0 mole) of JEFFAMINE D-400 (a polyoxyisopropylene diamine 400 from TEXACO CHEMICAL CO.) and 106 grams (2.0 moles) of acrylonitrile. This mixture was refluxed for about two hours at 78° C. to form the polyoxypropylene secondary di(imine-propionitrile) which was added to 2.0 moles of trimethylol propane triacrylate to form a photoprepolymer containing 4 acrylic double bonds per mole.

EXAMPLE 11

Into the equipment described in Example 1 were placed 508 grams (2.0 moles) of 1,6 hexylenediol di(methyl acrylate). Under cooling and constant stirring 122 grams (2.0 moles) of monoethanolamine were slowly added. The cooling bath was then removed and then the amine was added to form a hydroxyl imine-ester acrylate, 146 grams (1.0 mole) diethyl oxalate and 0.3 grams of hydroquinone inhibitor were added. The mixture was heated for 1 hour at 130° C. to remove 92 grams of ethanol and formed the dihydroxy-ethylene oxalamide-hexylene diol ester-diacrylate photoprepolymer.

EXAMPLE 12

Into the equipment described in Example 1 were placed 544 grams (4.0 moles) of 1,3 xylylene diamine. From a dropping funnel, under continuous stirring and cooling with cold water, 688 grams (8.0 moles) of methyl acrylate were added over a period of 1½ hours. When the exotherm had subsided, the mixture was heated to 100° C. until the bis-methyl-propionic ester of 1,3 xylylene diamine, having molecular weight of 308, was formed.

Into another 2 liter glass resin flask were placed 15.4 grams (0.5 moles) of bis-methyl-propionic ester of 1,3 xylylene diimine. Under continuous cooling and stirring, 511 grams of ADIPRENE L-100 (an isocyanate terminated polyether urethane prepolymer of about 4.175% NCO content), diluted with 100 grams of styrene monomer and formed an ester-secondary amine-urea polyether-urethane prepolymer. Part of the prepolymer was used in preparing component A, and part of it was used in preparing component B. Component A was prepared from 66.5 grams of the prepolymer, diluted with 20.1 grams of the Example 5 adduct, and 34.4 grams of an unsaturated polyester of 30% styrene monomer. Component B was formed from 133 grams of prepolymer, 11.6 grams of tetraethylene glycol dimethyl acrylate, 68.8 grams unsaturated polyester of 30% styrene and 37.1 grams of EPON-828. The mixing weight ratio of A/B is 0.48/1 and prior to their mixing about 1% of a ketone peroxide catalyst is added.

EXAMPLE 13

Into the equipment described in Example 1 were placed 4 moles (792 grams) of p,p' methylene dianiline and 3 moles (990 grams) of tetra-oxy-ethylene glycol dimethyl acrylate (TEGDMA). Under continuous stirring, the mixture was heated for about 1½ hours at 185° C. to form their adduct having a molecular weight of 1782 and 10 amine hydrogen atoms, of which 2 are primary and 6 are secondary. This adduct is a liquid of light brown color at ambient temperatures and has excellent storage stability. Component A was formed by mixing 178.2 grams (0.1 mole) of this adduct and 1.8 grams of CYMEL-303 (hexakis-methoxy-methylene melamine, American Cyanamide Co.). Component B was formed by mixing 145 grams of EPON-828, 33 grams of TEGDMA and 2 grams of CYMEL-303. The mixing weight ratio of A/B is equal to 1/1 and the initial viscosity of this mixture is about 600 cps. Films and coatings of this mixture thermoset at ambient temperature within about 18 to 24 hours, while optimum performance properties are obtained within 5 to 7 days.

The thermoset films and parts were found to have outstanding chemical resistance to concentrated hydrochloric acid, phosphoric acid, sulfuric acid, sodium hydroxide, styrene monomer, methyl isobutyl ketone and fair resistance to concentrated nitric acid. This outstanding chemical resistance performance is attributed to an increased aromatic content and is also accompanied by excellent physical performance properties of compactness, adhesion, flexibility, toughness, mar resistance, compression strength and others.

Other modifications included the solution of 0.1 mole (24.8) grams of p,p' sulfono dianiline into 180 grams of component A. Also, the 145 grams of EPON-828 were equivalently replaced with DOW-431, DOW-439 and DOW TACTIX-742 novolac di or triepoxide liquid resins. Furthermore, all the above epoxide resins were used in the form of adducts or mixtures with resorcinol, hydroquinone or other dihydroxy arylenes in the form of solutions in TEGDMA or other di or polyacrylates or methyl acrylates. The presence of prereacted or unreacted dihydroxy arylene greatly reduces the thermosetting time of component A and B mixtures to about 6 to 8 hours at ambient temperatures. In addition, such modifications further enhance chemical and physical performance properties, as well as temperature resistance. These liquid, solventless, polymeric systems thermoset at ambient temperatures within 6 to 8 hours through addition polymerizations.

The polymers may be mixed with aluminum oxide, aluminum silicate, silicon dioxide, and barium sulfate to make castings with up to 96% by weight of filler content, and most preferably, 75 to 80% by weight content, and can be reinforced if desired by iron or other metal bars. Illustrative applications are laboratory benches, fume hoods, acid bricks, industrial floors, construction of bridges, highways, airports, airport runways, silos, industrial and residential buildings. Composites with fiber glass, glass cloth, KEVLAR, nylon and inorganic fibers are readily made at ambient temperature, and have outstanding performance features.

EXAMPLE 14

An isocyanate terminated polyether-urethane prepolymer was prepared from the addition reaction of 5 moles (870 grams) of toluene diisocyanate and 4 moles (1600 grams) of polyoxyethylene diol having an average molecular weight of 400. Under continuous stirring, this adduct was slowly added to 2 moles (288 grams) of 1,6 hexamethylene diimine, di-methyl-propionate to form a secondary diamine terminated urea-polyether-urethane liquid prepolymer having a molecular weight of 2788, (see Example 1 for more details). Component A was formed by mixing 278.8 grams (0.1 mole) of this material, 891 grams (0.5 mole) of the adduct of 4 moles of p,p' methylene dianiline and 3 moles of TEGDMA prepared according to Example 13 with 23.2 grams CYMEL-303. Component B was formed by mixing 148 grams (0.5 mole) of tri methylol propane triacrylate, 55 grams (0.5 mole) of 1,4 dihydroxy benzene (hydroquinone), 910 (35+175+700) grams of DOW-431 novolac resin having an epoxide equivalent of about 175. The mixing weight ratio of A/B is about 1.072/1 by weight. Since there is an excess of one acrylate double bond per 4612 grams of the A plus B components over the stoichiometrical mixture, the final product is a "living" liquid solventless polymer thermosetting at ambient temperature.

The final flexibility and toughness is equal to or better than polyurethane-urea elastomers. Further improvements are obtained by incorporating the secondary diamine urea-polyether-urethane in the component B. Optional addition of styrene monomer diluted unsaturated polyesters or asphalt can be included in either or both A and B components. 1,4 or 1,3 dihydroxy benzenes accelerate the addition polymerization of aromatic and alkylene aromatic poly amines to polyfunctional acrylates and epoxides as well as to their own polyfunctional epoxides.

EXAMPLE 15

In a two liter, glass resin kettle fully equipped with a water trap, a thermocouple connected to a temperature recorder, a vertical water condenser, a motor driven stirrer and a heating mantel, were placed: 8 moles (864 grams) of meta phenylene diamine and 6 moles (516 grams) of methyl acrylic acid. Under continuous stirring and heating in nitrogen atmosphere at 150° to 180° C. for about 3½ hours, 6 moles (108 grams) of water were removed and the condensation adduct was formed having the following structure:

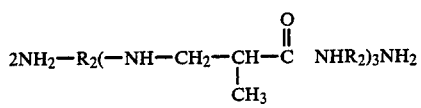

Wherein $R_2$ is equal to 1,3 phenylene divalent benzene, or other arylene or alkylene radicals. This product was further reacted at 180° C. with 1 mole (254 grams) of 1,6 hexylene diol dimethyl acrylate for about 1½ hours to form their respective liquid adducts.

The same reaction was repeated by changing the molar ratio of 2/1 of the polyamido-amine to the diacrylate to (n+1)/n utilizing either other arylene or alkylene diamines with methyl acrylic or acrylic acid or other difunctional dimethyl acrylates or diacrylates, wherein n is most preferably from 1 to 5. These diacrylates and dimethyl-acrylate adducts with polyamido-amine alone, and in conjunction with other arylene or alkylene diamines, as well as their adducts to diacrylates and dimethylacrylates, secondary diamine terminated urea polyether (or ester)—urethane prepolymers, with or without styrene diluted unsaturated polyesters were combined to formulate component A.

Component B was formulated from a liquid di or poly epoxide, selected from bisphenol A and novolac types, adducts of them with acrylic or methyl acrylic acid at the ratio of 1 or less carboxylic acid group per epoxide group, as well as their (n+1)/n adducts to either dihydroxy benzenes or di or secondary diamine ureapolyether (or ester)—urethane (or urea urethane) prepolymers, di or polyfunctional acrylates, styrene diluted unsaturated polyesters or asphalts. The stoichiometrical mixtures of components A and B are based on one amine hydrogen atom per epoxide group or per acrylate or methyl acrylate double bond. Also, a hydroxyl group of di or tri hydroxy arylenes is equivalent to an epoxide group. Any excess of acrylate or methyl acrylate groups over available amine hydrogen atoms purposely left after their stoichiometrical equivalent against the sum of epoxide and acrylate or methyl acrylate groups, comprises the living part of the composition.

EXAMPLE 16

In the equipment of the Example 1 were placed, 1025 grams (0.5 mole) of ADIPRENE L-100 containing about 4.1% by weight isocyanate content and 116 grams (1 mole) of hydroxyl ethylene acrylate. Under continuous stirring, the mixture was heated up to 70° C. for about 3 hours to form a liquid diacrylate terminated polyether-urethane prepolymer having a molecular weight of about 2282. ADIPRENE L-100 is a liquid ioscyanate terminated polyether-urethane based on toluene diisocyanate and poly butene oxide, butylene diol.

Other di or polyacrylates were prepared as follows: 2.0 moles of oxytetradecylamine (PA-14, TOMAH PRODUCTS CO.) and 1.0 mole of 1,6 hexylene diol diacrylate or 1.0 mole trimethylol propane triacrylate, were mixed for about 1 hour and followed by the addition, under cooking at ambient temperature, of 0.5 mole toluene diisocyanate or 0.5 mole p,p′ methylene diisocyanate. The final products are urea ester di or poly acrylates and were used alone or in conjunction with other diacrylates and an excess of liquid di or polyamines and their adducts with diacrylates to form component A. Component B was formed from liquid di or poly epoxides, dihydroxy arylenes, liquid di (or dimethyl) acrylates, further diluted with the above formed di or polyacrylates.

Another approach to hydroxy-acrylates and hydroxy-epoxy-acrylates is the addition of 2 or less moles of acrylic or methyl acrylic acid per mole of a liquid di or polyepoxide. This addition reaction is carried out by heating the mixture at 150° C. for about 1 hour.

EXAMPLE 17

In a two liter, fully equipped glass resin kettle were added 2 moles (460 grams) of PA-14 (oxytetradecylamine) and 2 moles (508 grams) of 1,6 hexylenediol dimethyl-acrylate. Under continuous cooling with an external cold water container the mixture was stirred for about 1 hour until 2 moles of the secondary aniline ester acrylate were formed. Then, 1 mole (146 grams) of diethyl oxalate was slowly added under continuous stirring and cooling. When the exotherm ceased, 0.6 grams of hydroquinone were added as an acrylate polymerization inhibitor, and the solution was heated to 130° C. for about 2 hours until 2 moles (92 grams) of ethanol were collected. The final product was a N,N′ substituted oxalamide dimethyl acrylate of the formula:

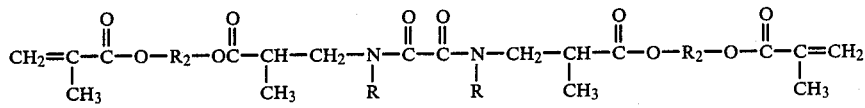

wherein R is an oxytetradecyl or other alkyl monovalent radical and $R_2$ is a hexylene or other alkylene divalent radical. In another experiment 2 moles (800 grams) of polyoxyethylene diol having an average molecular weight of 400 and 2.5 moles (435 grams) of toluene diisocyanate were used to make an isocyanate terminated polyether-urethane prepolymer. To this prepolymer were added 1 mole (72 grams) of acrylic acid, 0.5 grams of hydroquinone inhibitor and the mixture was heated for about 1½ hours up to 120° C. until 44 grams of carbon dioxide were evolved to form a polyether-urethane diamide, diacrylate. The di or polyacrylates of Examples 16 and 17 alone or in combination with other mono or polyfunctional acrylates, photocatalysts and photoinitiators comprise new one component photoprepolymers. Alternatively, the di or polyacrylates of Examples 16 and 17 are used as constituents of either component A or B to formulate the complex, solventless polymeric system of this invention. Specifically, those of molecular weight of about 1500, and predominantly of secondary amine or acrylate terminated polyether-urethane structures provide outstanding elastomeric properties in points, varnishes and castings, without the isocyanate termination deficiencies.

EXAMPLE 18

In a two liter, fully equipped, glass resin kettle, were placed 4 moles (432 grams) of metaphenylene diamine and 3 moles (258 grams) of methyl acrylic acid. The mixture was heated at 150° to 185° C. for about 3 hours until 3 moles (54 grams) of water were condensed and the pentamine triamide adduct and condensate was formed. Then, at 185° C. ⅔ moles (220 grams) of tetra oxyethylene glycol dimethyl-acrylate were added and heating was continued at this temperature for about 1½ hours to form their liquid adduct of 3/2 ratio having a gram-moles weight of 2568. The final product contains 17 amine hydrogen atoms, of which 4 are primary and 9 secondary, as well as 9 secondary amide groups and it is a polyamine-amide-ester structure. Component A was formed by mixing 25.68 grams (0.01 mole) of the previous structure with 116.4 grams (0.05 moles) of ADIPRENE L-100 adduct with 2 moles of 1,6 hexamethylene diimine dipropionate-ester, and 2.92 grams of CYMEL-303. Component B was formed by mixing 68 grams of EPON-828, 12 grams ortho-cresol and 22.8 grams (0.01 mole) of ADIPRENE L-100 adduct with 2 moles of hyroxyl ethylene acrylate. The mixing weight ratio of A/B is equal to 1.41/1.

EXAMPLE 19

An isocyanate terminated polyether-urethane prepolymer was prepared from the addition reaction of 3 moles (522 grams) of toluene diisocyanate to 2 moles (2000 grams) of polyoxypropylene diol having an average molecular weight of 1000. Separately, 1 mole (33 grams) of tetraoxyethylene glycol dimethyl-acrylate were added under mixing to 2.0 moles (460 grams) of oxytetradecylamine (PA-14) to form the adduct secondary diamine-ester, having a molecular weight of 990. To 198 grams (0.2 moles) of this compound were slowly added 252.2 grams (0.1 mole) of the isocyanate prepolymer followed by 226 grams (1 mole) of 1,6 hexylene diol diacrylate, 232 grams (2 moles) of 2 methyl 1,5 pentylene diamine and 20.8 grams of CYMEL-303 to form component A. Component B was formed from 89.7 grams of DOW-431 novolac resin, 50 grams hydroquinone and 200 grams of tri methylol propane triacrylate. The mixing weight ratio of A/B=0.81. Styrene diluted unsaturated polyester was added up to 70% by weight of the final composition to either component A or B. As a result, viscosity was reduced and in all instances a very flexible and tough polyester was obtained.

EXAMPLE 20

In a two liter glass resin kettle were placed 2 moles (460 grams) of oxytetradecylamine (PA-14). Under stirring and external cooling with cold water, 1 mole (330 grams) of tetraoxyethylene glycol dimethyl-acrylate was added within 30 minutes. The cooling bath was removed and mixing continued for another 30 minutes at 60° C. to secure the formation of the secondary diamine-ester, measured by their complete addition to the methyl acrylate double bonds. The mixture was cooled to 40° C. and under stirring were slowly added 0.8 moles (200 grams) of p,p' methylene diisocyanate and formed the secondary amine terminated polyester-urea prepolymer, having a molecular weight of repeating units equal to about 990 and 0.4 secondary amine groups. The above prepolymer was diluted with 38 grams of CYMEL-303, 3 moles (348 grams) of 1,6 hexamethylene diamine and 1.5 moles (330 grams) of 1,6 hexylene diol diacrylate to form component A. Component B was formed from 1440 grams EPON-826, 330 grams of tetraoxyethylene glycol dimethyl-acrylate, 100 grams of trimethylol propane triacrylate, and 110 grams of 1,3 dihydroxy benzene. The mixing weight ratio of A/B was equal to 0.863. To 17.4 grams of component A were added 10 grams titanium dioxide (rutile type) and 5 grams of aluminum oxide. To 19.9 grams of component B were added 8.5 grams of aluminum oxide and 4 grams of phthalocyamine green dye. The weight mixing ratio was A/B=1 and after grinding and mixing, a semigloss green film of 65 initial gloss reading at a 60° angle was obtained. Similarly, other shades were obtained by adding different dyes.

Foamed sandstones were produced by mixing 17.4 grams of component A, 19.9 grams of component B, 146 grams sand, 3.2 grams of chrome green oxide and 50 grams of methyl isobutyl ketone, freons, or cyclohexane.

EXAMPLE 21

Secondary amine terminated poly-ether-urethane-ureas were obtained as follows: 348 grams (2 moles) of toluene diisocyanate were mixed with 400 grams (1 mole) of polyoxyethylene glycol E-400, having an average molecular weight of 400, to form an isocyanate terminated prepolymer. Under cooling and mixing this prepolymer was slowly added to 948 grams (1.2 moles) of the disecondary diamine-ester adduct of Example 20 (2 moles of PA-14 and 1 mole TEGDMA) to form a secondary amine terminated polyurethane-urea-ether-ester prepolymer, which was further diluted with 1.5 moles (2673 grams) of the adduct of Example 13 (4/3 moles of p,p' MDA and TEGDMA) and 71 grams CYMEL-303, to form component A. Component B was formed by mixing 445 grams of TEGDMA, 110 grams of resorcinol and 2235 grams of EPON-826. The mixing weight ratio of component A/B is equal to 1.59. Laminates made from 44 grams of component A, 279 grams of component B, and 1114 grams of glass cloth at about ⅛ inch thickness were difficult to penetrate with pistol bullets.

What is claimed is:

1. A copolymer comprising the addition reaction product of:
   a first component comprising at least one amine or acrylate terminated polyurethane, polyurethaneurea or polyurea; and
   a second component comprising at least one di or polyacrylate with a structure other than that of said first component.

2. A copolymer as defined in claim 1, wherein said di or polyacrylates in said second component comprise acrylate terminated polyurethanes, polyurethane-ureas or polyureas.

3. A copolymer as defined in claim 1, further comprising a peroxide catalyst.

4. A copolymer as defined in claim 1, further comprising
   at least one pigment, dye, fiber, sand filler, or pigment extender.

5. A copolymer as defined in claim 1, further comprising about 75 to 85 percent by weight sand or ground glass filler and a hydrocarbon or fluorocarbon foaming agent having a boiling point below about 80° C. to reduce the specific gravity of the copolymer about ½ to 1/20 of its normal value.

6. A copolymer as defined in claim 1, further comprising
from about 1 to about 20 percent by weight of a dihydroxy benzene or cresol as a catalyst for a subsequent addition reaction with an aromatic amine at ambient temperatures.

* * * * *